US011987998B2

(12) United States Patent
Herzog et al.

(10) Patent No.: US 11,987,998 B2
(45) Date of Patent: May 21, 2024

(54) CLIMBING DEVICE HAVING A CLIMBING RAIL

(71) Applicant: PERI SE, Weissenhorn (DE)

(72) Inventors: Robert Herzog, Oepfingen (DE); Matthias Tries, Ehingen (DE)

(73) Assignee: PERI SE, Weissenhorn (DE)

( * ) Notice: Subject to any disclaimer, the term of this patent is extended or adjusted under 35 U.S.C. 154(b) by 1120 days.

(21) Appl. No.: 16/586,336

(22) Filed: Sep. 27, 2019

(65) Prior Publication Data

US 2020/0095785 A1 Mar. 26, 2020

Related U.S. Application Data

(63) Continuation of application No. 15/849,618, filed on Dec. 20, 2017, now Pat. No. 10,465,398.

(30) Foreign Application Priority Data

Dec. 23, 2016 (DE) ..................... 10 2016 125 549.1

(51) Int. Cl.
*E04G 11/28* (2006.01)
*E04G 3/28* (2006.01)
(Continued)

(52) U.S. Cl.
CPC ................ *E04G 11/28* (2013.01); *E04G 3/28* (2013.01); *E04G 5/001* (2013.01); *E04G 5/04* (2013.01);
(Continued)

(58) Field of Classification Search
CPC ........... E04G 11/28; E04G 3/28; E04G 5/001; E04G 2001/242; E04G 2003/286; F15B 15/18; F15B 11/22; Y10T 29/53039
See application file for complete search history.

(56) References Cited

U.S. PATENT DOCUMENTS 3,628,223 A * 12/1971 Babee .................... E04G 11/28 249/20
3,752,039 A * 8/1973 Hewins
(Continued)

FOREIGN PATENT DOCUMENTS

DE 3842094 6/1990
DE 3842094 A1 6/1990
(Continued)

*Primary Examiner* — Jessica L Laux
*Assistant Examiner* — Kathleen M. McFarland
(74) *Attorney, Agent, or Firm* — SLEMAN & LUND LLP

(57) ABSTRACT

A climbing device is proposed having at least one climbing rail for adjusting and/or climbing a scaffolding and/or a formwork and/or a platform, at least one climbing shoe being arranged on the climbing rail, at least one hydraulic cylinder comprising at least one drive piston, arranged in a cylinder housing, and having a hydraulic fluid being provided for raising the climbing shoe and/or the climbing rail and/or the scaffolding and/or the formwork and/or the platform, which at least partially avoids or at least reduces the disadvantages of the prior art. According to the invention this is achieved in that the hydraulic cylinder is embodied as a hydraulic unit, the hydraulic unit comprising at least one hydraulic tank for storing hydraulic fluid, an electric motor and a hydraulic pump driven by the electric motor for pressurizing the hydraulic fluid.

11 Claims, 4 Drawing Sheets

Figure 1:
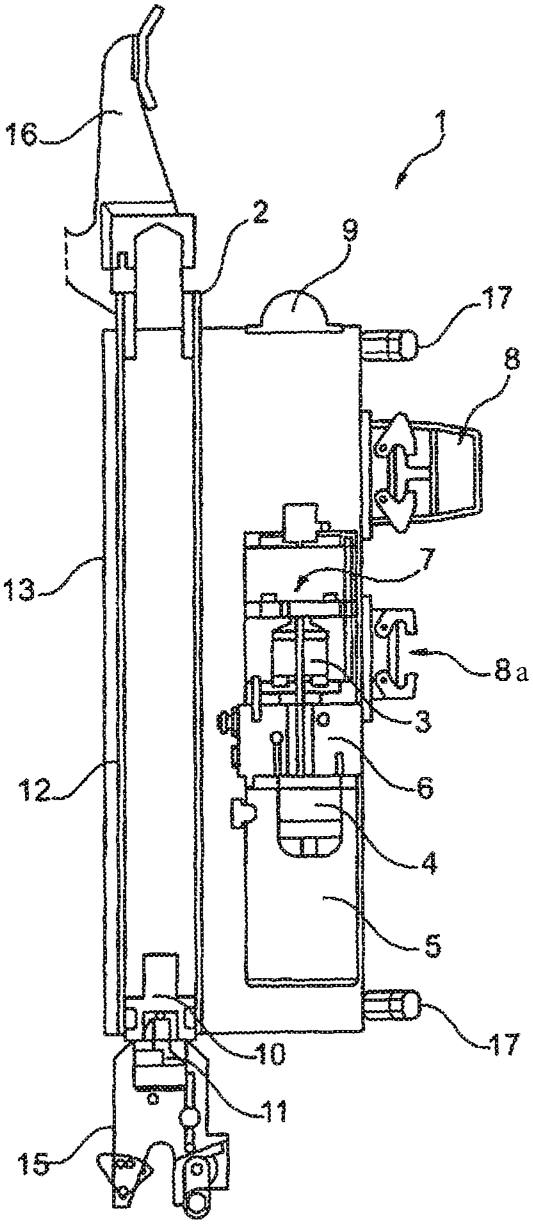

(51) Int. Cl.

| | |
|---|---|
| ***E04G 5/00*** | (2006.01) |
| ***E04G 5/04*** | (2006.01) |
| ***E04G 11/24*** | (2006.01) |
| ***F15B 15/18*** | (2006.01) |
| *E04G 1/24* | (2006.01) |

(52) U.S. Cl.
CPC ........ *E04G 11/24* (2013.01); *E04G 2001/242* (2013.01); *E04G 2003/286* (2013.01); *F15B 15/18* (2013.01)

(56) References Cited

U.S. PATENT DOCUMENTS

| | | | | | |
|---|---|---|---|---|---|
| 4,147,483 | A * | 4/1979 | Rovera | E04G 11/28 | 249/20 |
| 4,694,933 | A * | 9/1987 | Sinko | E04G 3/24 | 182/128 |
| 5,000,287 | A * | 3/1991 | Schworer | E04G 11/28 | 182/136 |
| 5,630,482 | A * | 5/1997 | Schworer | E04G 11/28 | 425/65 |
| 5,992,565 | A * | 11/1999 | Lingen | B66B 9/16 | 182/141 |
| 6,557,817 | B2 * | 5/2003 | Waldschmitt | E04G 11/28 | 249/19 |
| 7,513,480 | B2 * | 4/2009 | Bergaretxe | E04G 11/28 | 249/20 |
| 8,464,996 | B2 * | 6/2013 | Spindler | E04G 11/28 | 249/20 |
| 8,673,189 | B2 * | 3/2014 | Schwoerer | E04G 11/28 | 249/20 |
| 8,708,100 | B2 * | 4/2014 | Schwoerer | E04G 11/28 | 182/20 |
| 9,181,719 | B2 * | 11/2015 | Jentsch | B28B 1/14 | |
| 9,303,418 | B2 * | 4/2016 | Schwoerer | E04G 11/28 | |
| 9,476,210 | B2 * | 10/2016 | Urzelai Ezkibel | E04G 3/28 | |
| 9,611,663 | B2 * | 4/2017 | Baum | E04G 11/24 | |
| 9,945,135 | B2 * | 4/2018 | Aranburu Etxezarreta | E04G 5/04 | |
| 10,358,833 | B2 * | 7/2019 | Dingler | E04G 3/28 | |
| 10,428,536 | B2 * | 10/2019 | Gardner | G06F 1/3265 | |
| 10,590,664 | B2 * | 3/2020 | Aranburu Etxezarreta | E04G 3/28 | |
| 10,711,470 | B2 * | 7/2020 | Vogl | E04G 11/32 | |
| 2003/0052249 | A1 * | 3/2003 | Waldschmitt | E04G 11/28 | 249/20 |
| 2005/0091972 | A1 * | 5/2005 | Redman | F15B 11/022 | 60/413 |
| 2007/0119116 | A1 * | 5/2007 | Arozena Bergaretxe | E04G 11/28 | 52/633 |
| 2007/0119160 | A1 * | 5/2007 | Menze | F15B 1/26 | 60/431 |
| 2008/0257644 | A1 * | 10/2008 | Schwoerer | E04G 3/20 | 182/142 |
| 2009/0041879 | A1 * | 2/2009 | Baum | E04G 11/28 | 33/286 |
| 2009/0173574 | A1 * | 7/2009 | Hobmeier | E04G 11/28 | 182/82 |
| 2009/0189053 | A1 * | 7/2009 | Spindler | E04G 11/28 | 249/19 |
| 2010/0038518 | A1 * | 2/2010 | Schwoerer | E04G 11/28 | 249/20 |
| 2011/0171336 | A1 * | 7/2011 | Schwoerer | E04G 21/00 | 425/63 |
| 2013/0020732 | A1 * | 1/2013 | Jentsch | E04G 21/02 | 249/20 |
| 2013/0341813 | A1 * | 12/2013 | Baum | E04G 11/28 | 264/33 |
| 2015/0101887 | A1 * | 4/2015 | Schwoerer | E04G 11/28 | 182/142 |
| 2015/0129359 | A1 * | 5/2015 | Urzelai Ezkibel | E04G 5/04 | 182/82 |
| 2016/0040441 | A1 * | 2/2016 | Dingler | E04G 21/3223 | 248/241 |
| 2018/0023308 | A1 * | 1/2018 | Aranburu Etxezarreta | E04G 21/3247 | 52/126.1 |
| 2019/0071884 | A1 * | 3/2019 | Aranburu Etxezarreta | E04G 3/28 | |
| 2019/0145111 | A1 * | 5/2019 | Vogl | E04G 11/32 | 249/20 |

FOREIGN PATENT DOCUMENTS

| | | |
|---|---|---|
| DE | 102005030335 | 1/2007 |
| DE | 102005030336 A1 | 1/2007 |
| JP | 2009204052 | 9/2009 |
| WO | 2013120419 | 8/2013 |

* cited by examiner

CLIMBING DEVICE HAVING A CLIMBING RAIL

The invention relates to a climbing device having at least one climbing rail for adjusting and/or climbing a scaffolding and/or a formwork and/or a platform according to the pre-characterizing part of claim 1 and a corresponding climbing system.

PRIOR ART

In constructing or producing walls, floors, counter-ceilings or roofs etc., that is to say primarily in the formwork and scaffolding sector, the climbing devices used, such as climbing scaffolds, displaceable platforms and climbing formworks, for example, are preferably ones which are usually arranged on a structure or building that is to be constructed from concrete, in particular a high-rise building, wind power station, storage silo, bridge piers or power station and cooling towers etc., and which are integral parts of a so-called climbing system or a climbing formwork, which after concreting of a section of a structural wall is raised (without external intervention) one section higher, that is to say it "independently climbs upwards", so that a further section of the wall can be concreted there.

The essence of such a displaceable platform lies in the fact that in climbing it does not have or need a direct connection to the ground and is only fixed to the already concreted section situated below the section to be concreted by climbing or so-called "support shoes". Two carrier rails arranged side by side at an interval from one another are usually provided for each formwork panel. In principle, however, a version having only one carrier rail in the center of a formwork panel is also possible.

In principle these climbing devices can also be used for the horizontal or upwards sloping displacement/climbing of tunnel formwork transport wagons, reinforcement transport wagons, and mobile wall formworks, for example for retaining walls or the like.

Owing to the extensive concreting widths and therefore formwork widths, the climbing systems already in use must be synchronized with adjacent climbing devices and climbing rails, constant observations and correction often proving unable to maintain this synchronization.

Such self-climbing devices (cf. for example DE 10 2005 030 336 A1) have at least one linear drive or a hydraulic drive/cylinder, which generates a relative movement between at least one displaceable bracket and at least one carrier/climbing rail running in the displacement direction, the connection between the linear drive and the carrier rail being created by climbing shoes or so-called climbing heads arranged at a distance from one another, which usually comprise a pivoting locking element or the like and have locking cams interacting with the locking element in the path of the locking element traversed in a relative movement between the carrier rail and the climbing head/climbing shoe, the locking element being raised above the locking cam in the event of a relative movement in one direction, but running onto the locking cam in the other direction of movement, so that the one climbing head/shoe is positively interlocked with the carrier rail, blocking this relative movement, whilst a relative movement overcoming the locking cam occurs on the other climbing head/shoe.

In climbing, the section of scaffolding has no direct connection to the ground, nor is any crane needed, if a linear drive, for example a hydraulic drive, is provided on the scaffolding, which drive in one operation raises the scaffolding section on the carrier rail and in the other operation raises the carrier rail relative to the scaffolding section.

One disadvantage with the existing climbing devices, however, is that the several meter-long hydraulic hoses between the hydraulic cylinders and the carrier rails have to be coupled and uncoupled again for each section or story. This gives rise on the one hand to leakages/losses, so that after a certain time the tank/reservoir is drained of hydraulic fluid and has to be filled up again.

On the other hand, in the rough, dirty construction site conditions fouling of the hydraulic connections and damage to the hydraulic meter-long pressure hoses, lying around on the scaffolding and the climbing device, can occur, which can impair or damage the hydraulic system and even cause a (temporary) halt to operations and necessitate repair or replacement of the pressure hoses.

Power losses moreover occur in the hoses that are many meters long, which is something the central hydraulic pump has to compensate for; otherwise a fall in pressure occurs on the individual cylinders, therefore reducing the climbing/lifting force. At the same time minimal hydraulic differences/tolerances in the components used mean that a laborious calibration of the (multiple) hydraulic cylinders is necessary in order to ensure that these multiple cylinders and scaffolding modules/formworks operate as synchronously as possible.

For safety reasons, due among other things to the fact that personnel are also sometimes raised with the climbing device, the hydraulic components, in particular meter-long pressure hoses, must meet very stringent requirements, which means a very high maintenance and servicing/replacement cost.

OBJECT AND ADVANTAGES OF THE INVENTION

In contrast, the object of the invention is to propose a climbing device having at least one climbing rail for adjusting and/or climbing a scaffolding and/or a formwork and/or a platform, which at least partially avoids or at least reduces the disadvantages of the prior art.

Proceeding from a climbing device having at least one climbing rail for adjusting and/or climbing a scaffolding and/or a formwork and/or a platform of the aforesaid type, this object is achieved by the characterizing features of claim 1. The measures specified in the dependent claims allow advantageous embodiments and developments of the invention.

Accordingly, a distinguishing feature of a climbing device according to the invention is that the hydraulic cylinder is embodied as a hydraulic unit, the hydraulic unit comprising at least one hydraulic tank for storing hydraulic fluid, an electric motor and a hydraulic pump that can be driven by the electric motor for pressurizing the hydraulic fluid.

This measure means that the hydraulic unit is advantageously embodied as a separately operated hydraulic module. This or each hydraulic unit/module is assigned to each climbing rail. For example, in a relatively large structural formwork with 20 or 30 climbing rails according to the invention 20 or 30 hydraulic units/modules are used, so that not only 20 or 30 hydraulic cylinders but according to the invention furthermore also 20 or 30 hydraulic tanks, 20 or 30 electric motors and 20 or 30 hydraulic pumps are provided. This means that as far as possible a complete or hydraulically fully functional/independent hydraulic unit/module is feasible, which is arranged (directly) on a climbing rail or is in each case operatively connected to an associated climbing rail in order to perform the relative adjustment between the structure/building and the climbing device/system/scaffolding and the climbing/raising of the climbing device according to the invention.

This means, among other things, that according to the invention meter-long hydraulic hoses can be avoided and no longer have to be used. Accordingly, the pressure hoses or flexible/elastic hydraulic lines which are especially prone to failure and hitherto used to lie around, sometimes over several dozen meters on a scaffolding or a climbing device according to the prior art, or had to be inserted between the individual hydraulic cylinders or climbing rails, are entirely eliminated. This elimination by the invention of long, flexible, hydraulic pressure hoses between the various hydraulic cylinders or rails already of its self brings about a significant improvement in operating reliability and avoids any fouling of the hydraulic system or circuit. Thus, for example, so-called socket couplings or the like on/between the individual hydraulic cylinders can be entirely avoided.

The hydraulic unit/module advantageously comprises rigid and/or firmly fixed hydraulic lines, in particular metal pipes with threaded connections, crimped connections or the like, preferably between the hydraulic cylinder and the hydraulic pump and/or between the hydraulic pump and the hydraulic tank/hydraulic accumulator. The essential thing here is that these hydraulic lines are not detached and connected/coupled up/screwed on again in operation or before and after a climbing operational phase. Instead, these hydraulic couplings/connections are generated/made, for example firmly screwed on or crimped, during the assembly/manufacture of the hydraulic unit/module, and have only to be detached in the event of a repair or a replacement of the hydraulic cylinder and/or the hydraulic pump and/or of the hydraulic tank/hydraulic accumulator.

Accordingly, the hydraulic tank/hydraulic accumulator and the hydraulic circuit can be "filled for life". That is to say the hydraulic fluid is introduced/fed in during the manufacture and assembly of the hydraulic unit/module and possibly lasts for the entire service life of the hydraulic unit/module without the need for topping up.

In an advantageous variant of the invention the hydraulic unit or hydraulic module comprises a housing shell and/or a housing frame, at least the cylinder housing of the hydraulic cylinder, the hydraulic tank, the electric motor and the hydraulic pump being arranged and firmly fixed at least partially inside the housing shell and/or housing frame. This serves to improve the scope for (separate) operation of the hydraulic unit or hydraulic module. Moreover, the housing shell and/or housing frame serves to protect the hydraulic unit or hydraulic module (externally) from harm or damage. This is of great advantage particularly in the rough, dirty construction site conditions. For example, a (heavy) element/tool falling over or dropping is advantageously prevented by the housing shell and/or housing frame from damaging an "internal part" or an internally arranged component, in particular a pressurized element/pipe and/or an electronic/electrical element such as a circuit board, an electronic unit etc. This also increases the operating reliability of the climbing device according to the invention.

The housing shell may preferably be of a virtually fully closed construction, that is to say it may have a virtually closed shell/enveloping surface. For example, a plastic and/or metal housing is provided as housing shell of the hydraulic unit or hydraulic module. However, without departing from the scope of the invention the housing shell may also comprise openings, cut-outs or passages or the like. If necessary, only a rigid frame or the like is constructed as the housing frame according to the invention, which keeps together the corresponding elements/components of the hydraulic unit or hydraulic module according to the invention, in particular with or without an aforementioned housing shell, so that the hydraulic unit is advantageously embodied as a separately operated unit or as an integral module.

In one particular development of the invention (rigid and/or fixedly connected) hydraulic lines/pipes are provided inside the housing shell and/or housing frame for hydraulically connecting the hydraulic pump to the hydraulic cylinder and/or between the hydraulic pump and hydraulic tank/hydraulic accumulator, and/or the hydraulic unit or hydraulic module comprises a closed hydraulic circuit. This serves to achieve an advantageous hydraulic autonomy or independence of the hydraulic unit or hydraulic module according to the invention. This makes the hydraulic unit or hydraulic module particularly flexible in terms of its insertion/positioning and operation.

In principle it is feasible, for example, for the hydraulic unit or hydraulic module to be designed and/or arranged so that not only can the climbing device according to the invention be raised, but the hydraulic unit or hydraulic module also raises itself or itself climbs with the device. The latter means that the hydraulic cylinder, at one end firmly fixed to the building etc., does not have to be detached or dismounted following the climbing or the climbing phase, usually comprising multiple climbing steps, that is to say the raising phase, and carried to the next floor/story above, as have hitherto been necessary; instead the entire hydraulic unit or hydraulic module according to the invention raises itself or itself performs a climbing step following a climbing step or after the climbing/raising phase. Here a double or bilaterally acting hydraulic cylinder is advantageous, so that the extended piston rod with fixed (upper) end lifts the lower end and/or the cylinder or the cylinder housing and the hydraulic unit pulls itself up. Accordingly, it is feasible for one end of the hydraulic unit to be alternately fixed and the other end of the hydraulic unit to be adjusted or raised. This would dispense with the need for dismounting on a lower story and subsequent transporting or carrying by personnel and then fitting the hydraulic system or the hydraulic unit to/on a higher story.

For example, a power supply device of the hydraulic unit comprises at least one electrical connection element for delivering electrical power. Preferably only an electrical power supply is provided as power supply to the hydraulic unit or hydraulic module and not a hydraulic power supply. This means that only electrical cables/connections can/must be provided between two or more hydraulic units or hydraulic modules. This affords a significantly more flexible power supply for the climbing or raising of the climbing device or a complex/larger climbing system having numerous climbing devices and/or hydraulic units or hydraulic modules. The outlay for the power supply is hereby decisively reduced/improved.

Power losses such as occurred in the existing hydraulic power supply systems or meter-long hydraulic hoses are moreover thereby avoided. This increases the input energy efficiency.

The hydraulic unit or hydraulic module advantageously comprises an electrical power storage system, in particular an accumulator such as a lithium ion battery etc., and/or an electrical power source or electrical generator such as a solar cell or photovoltaic unit, for example. Complete (energy) self-sufficiency or independence of the individual hydraulic unit or hydraulic modules can thereby be achieved. For example, a solar energy facility may be used in conjunction with an electrical power storage system, the power storage system being charged by solar energy or a photovoltaic unit, which is used for pressure generation and/or electrical monitoring/control/regulation. This is of great advantage particularly in the case of climbing devices according to the invention, since the climbing phase is comparatively short, for example approximately 20 to 50 minutes, followed by a relatively long construction/concreting phase, for example approximately 2 to 5 hours or even a day or more, that is to say a rest phase of the hydraulic unit or hydraulic module, which corresponds to an operational phase with no climbing or without any climbing power consumption.

Accordingly, a photovoltaic unit or the like of comparatively small dimensions is advantageously capable, particularly in sunny localities/countries, of charging the electrical power storage system and storing a comparatively large amount of electrical energy and making this available to the electric motor and the pressure generation and hence the climbing/raising of the climbing device according to the invention in the relatively short climbing phase.

The hydraulic unit preferably comprises at least one electrical and/or electronic control unit for controlling at least the hydraulic cylinder and/or electric motor. This serves to ensure, particularly when at least two or more hydraulic units or hydraulic modules are used, that an advantageous electrical/electronic balance or a synchronization of the hydraulic cylinders is achieved. Thus a climbing system and a network, for example, with approximately 11 to 50 hydraulic cylinders/units or hydraulic modules can be electronically/electrically monitored and controlled, in order to achieve an even climbing of the climbing device. An elaborate hydraulic balancing or calibration, as in the prior art, is eliminated.

At least a first hydraulic unit and a second hydraulic unit are advantageously provided, in particular multiple hydraulic units or hydraulic modules, at least one electrical connecting lead being arranged between the first and the second hydraulic unit or between all the hydraulic units or hydraulic modules, (each) for the electrical and/or electronic connection and/or for the electrical power supply and/or for the electronic transmission of data and information.

At least one electrical and/or electronic central unit is preferably provided for controlling at least the first and the second hydraulic unit and/or all the hydraulic units or hydraulic modules. The central unit is integrated into the first hydraulic unit, for example, so that the first hydraulic unit is designed as master hydraulic unit and the second hydraulic unit and/or further hydraulic units as slave hydraulic units.

Alternatively or in combination with this the central unit may also be embodied as a separate component/unit of the climbing device according to the invention, which is connected to the hydraulic unit(s) electrically and/or electronically, or by wired means and/or wirelessly or via remote data/radio transmission. The central unit may take the form, for example, of a computer, notebook, laptop, PDA, smartphone or the like.

The connection between the hydraulic units or hydraulic modules and/or between hydraulic units and the central unit advantageously comprises at least one transmitter and/or receiver for wireless information and data transmission between at least two hydraulic units or hydraulic modules and/or between the control unit and/or the central unit and/or the hydraulic units etc. Such a radio connection between two hydraulic units or hydraulic modules and the control and/or central unit affords an especially flexible data connection or control/monitoring of the climbing device according to the invention. This reduces the outlay for the laying of cables, for example between corresponding units or between the hydraulic units or hydraulic modules, sometimes spaced at intervals of several (dozen) meters from one another.

In one particular development of the invention the electrical and/or electronic control unit or the addressable control unit is embodied as a control unit for monitoring the operating state of the hydraulic units or hydraulic modules. The control unit preferably comprises an addressable interface to a digital data transmission unit. This measure serves to allow activation or control/monitoring of the hydraulic unit or hydraulic module when the digital data transmission unit transmits addressed data or data with a corresponding address of the hydraulic unit or hydraulic module to the addressable interface. Accordingly, given a correspondingly transmitted or correct address, the interface advantageously switches or connects the electrical energy/information of the hydraulic units or hydraulic modules. The data/information transmission is preferably separate from the power supply. Two energy conductor elements or electrical supply cables/leads are now hereby sufficient for the power supply of the hydraulic units or hydraulic modules.

Multiple hydraulic units or hydraulic modules according to the invention are advantageously connected in series in relation to the power supply, or a single power circuit is provided for multiple hydraulic units or hydraulic modules. Control or balancing/synchronization is advantageously achieved through the addressing. This means, for example, that with multiple, for example 20 to 40 hydraulic units or hydraulic modules a specific hydraulic unit or hydraulic module is activated/controlled when the associated address, which is transmitted to the addressable interface by means of the digital data transmission unit and matches an advantageously defined address of the specific interface or hydraulic unit or hydraulic module. The interface accordingly switches or connects the respective hydraulic unit or the respective electric motor of the hydraulic pump to the power supply, in order to control/regulate the adjustment/extending of the piston or the coordination of the adjustment of all hydraulic cylinders.

Should the address transmitted by means of the data transmission unit not match the defined address of the hydraulic unit, the interface of the corresponding hydraulic unit or hydraulic modules does not switch and the electric motor continues to be operated and supplied with power without any change. That is to say there is no variation or adjustment/correction of the rate at which the piston extends.

In one particular development of the invention at least one address and/or a code is assigned substantially to each of the hydraulic units or hydraulic modules. Such addressing or coding of the individual hydraulic units or hydraulic modules serves to achieve an unambiguous or advantageous assignment. This is of particular advantage especially in the case of a wireless data transmission between the hydraulic units or hydraulic modules.

In an advantageous variant of the invention at least one electrical data memory is provided for storing the operating states of at least one of the hydraulic units or hydraulic modules and/or hydraulic cylinders. Such an advantageous data memory advantageously serves, for example, for performing statistical analyses among other things over a specific operating period for an application or a construction site, or for example a month or a year. For example, faults, damage etc. on the hydraulic units or hydraulic modules can be correspondingly stored or detected.

At least one display unit is preferably provided for visually displaying the operating states of at least one of the hydraulic units or hydraulic modules and/or the hydraulic cylinders. The display unit takes the form, in particular, of a display screen. Such an advantageous visual representation affords entirely fresh scope for the central monitoring or remote monitoring of multiple hydraulic units or climbing devices according to the invention.

In addition the display unit also serves precisely for visual representations of the stored operating states or statistically evaluated operating states and/or actual states during the climbing phase.

The display unit is preferably designed for displaying all hydraulic units or hydraulic modules and/or data connections. This advantageously allows overall monitoring of all the components or hydraulic units or hydraulic modules concerned. This is of particular advantage especially for a site manager, foreman, manager or the like, in centrally registering or aggregating the individual hydraulic units or hydraulic modules and hence the individual hydraulic cylinders or the like, for example, looking at or monitoring these at a later time, possibly with the aid of the advantageous data storage, and/or performing statistical calculations and representing them in an advantageous way. This affords a new way of optimizing the operation of the monitored climbing phase or climbing device according to the invention.

A computer in particular, preferably a notebook computer, a so-called PDA, or even a mobile phone or other portable electronic media are of particular advantage for displaying and/or storing and calculating statistical analyses or the like.

advantageously covers the entire operation of the climbing device or of the climbing system according to the invention, particularly where computers, notebook computers, PDA or the like are used. For example, such electronic devices are incorporated or integrated into the hydraulic unit or hydraulic module via advantageous or standard commercial interfaces. Here, for example, so-called bus systems may be used, such as, for example, USB, RS232, Ethernet etc., but also wireless communications systems such as Bluetooth etc. According to the invention a complex network with multiple hydraulic units or hydraulic modules and possibly computers, mobile phones, PDA or the like can be set up, which make it possible to display the operating states of widely differing hydraulic units or hydraulic modules.

A hydraulic unit or hydraulic module may generally also comprise further units, such as, for example, acoustic signaling, further sensors for registering particular states etc. Their operating states or signals can advantageously be processed like the operating states of the hydraulic units or hydraulic modules, as outlined above, or relayed to the control unit or the central unit and if necessary displayed. This is an advantageous way of incorporating further functions and controls of the hydraulic units or hydraulic modules.

In principle it is also feasible by means of an advantageous programming, for example by means of a so-called App program or the like, to achieve integration for the operation of the climbing device according to the invention or new functions of appropriate (mobile) telecommunications devices for no great outlay. For example, the manufacturer of one climbing device according to the invention provides corresponding software or "Apps" for the customers or users of the climbing device according to the invention. This can be achieved, for example, via remote data transmission or Internet or the like, so that the user can then additionally use his existing, for example, private mobile telecommunications device (with Internet connection) such as a smartphone, tablet or the like, also for configuring or modifying the settings and/or display or monitoring/controlling climbing devices according to the invention. This endows the climbing device according to the invention with an additional functionality. In this way, for example, the outlay for monitoring and/or displaying the climbing device or a relatively complex/larger climbing system is considerably reduced.

Through appropriate coding or modulation and/or encryption of the wireless adjustment information a high degree of operational security is achieved in the case of the climbing device. For example, display/monitoring/control using a mobile telecommunications device can also be secured against unauthorized tampering by using a password or corresponding access code.

In principle the customer/user can take or receive the information for configuration or adjustment of the operating parameters and/or operation via the Internet and/or via an "App" or the like and store it on corresponding telecommunications devices and advantageously then wirelessly transmit the information or settings or the configurations to the climbing device according to the invention. Also, for example, an advantageous simulation of selected operating parameters or the "envisaged" operating parameters may also be simulated and varied on an Internet page, an "App" or with the aid of the (mobile) telecommunications device on the display screen. Thus, for example, pressures, piston speeds, soft starting and/or soft runout or so-called "ramps", pause intervals or operating times and operating pauses as well as warning signals or signal lights or signal tones, in particular their loudness, frequency or pulsing, fading etc. and/or tone sequences or melodies or the like can be watched or listened to by means of the advantageous telecommunications device and/or adjusted or played and according to the invention transmitted wirelessly to the climbing device and the latter thereby configured according to the invention or its operating parameters correspondingly set.

At least one piston sensor is preferably provided for registering the position/adjustment of the drive piston of the hydraulic cylinder, in particular a volumetric sensor or cable sensor or the like. This serves for detecting the actual position of the drive piston and preferably all drive pistons of all hydraulic cylinders. Thus by means of the control unit it is advantageously possible to achieve a balancing or separate monitoring/control of the/the individual hydraulic cylinder(s) or all hydraulic units or hydraulic modules (separately), in order to ensure a largely precise synchronization of the climbing process and the climbing device according to the invention.

In principle according to the invention it is possible to combine any number of hydraulic units or hydraulic modules with one another, in particular all the units existing/needed and/or also an even or an odd number of hydraulic units or hydraulic modules. In the prior art, on the other hand, so-called flow dividers were usual, in order to operate two cylinders synchronously with a common pump, which therefore only allowed the use of an even number of hydraulic cylinders. The electrical/electronic balancing or synchronization according to the invention is therefore decisively more flexible and can be used with virtually no restrictions.

EXEMPLARY EMBODIMENT

An exemplary embodiment of the invention is represented in the drawing and is explained in more detail below with reference to the figures, of which.

Figure 2:
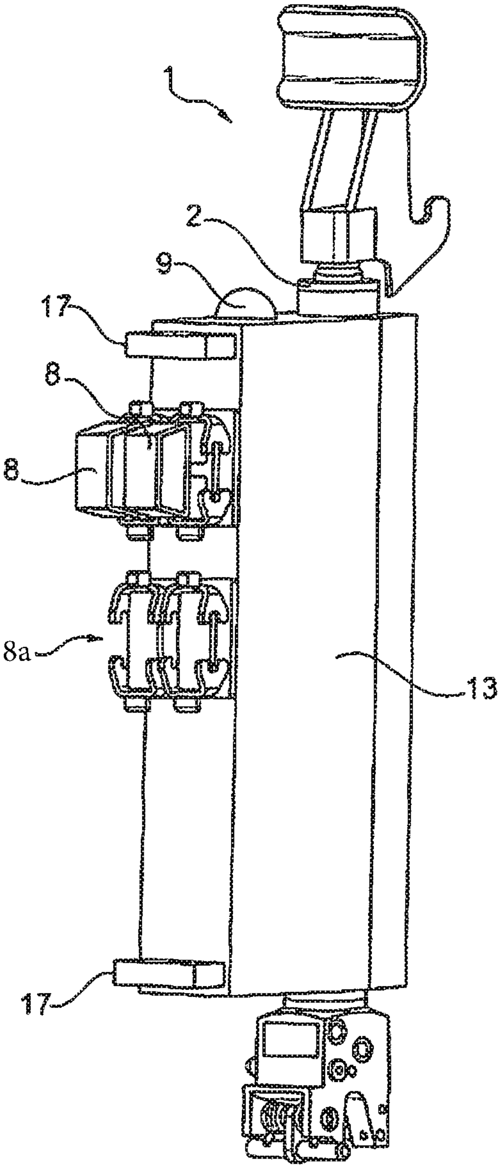
Figure 3:
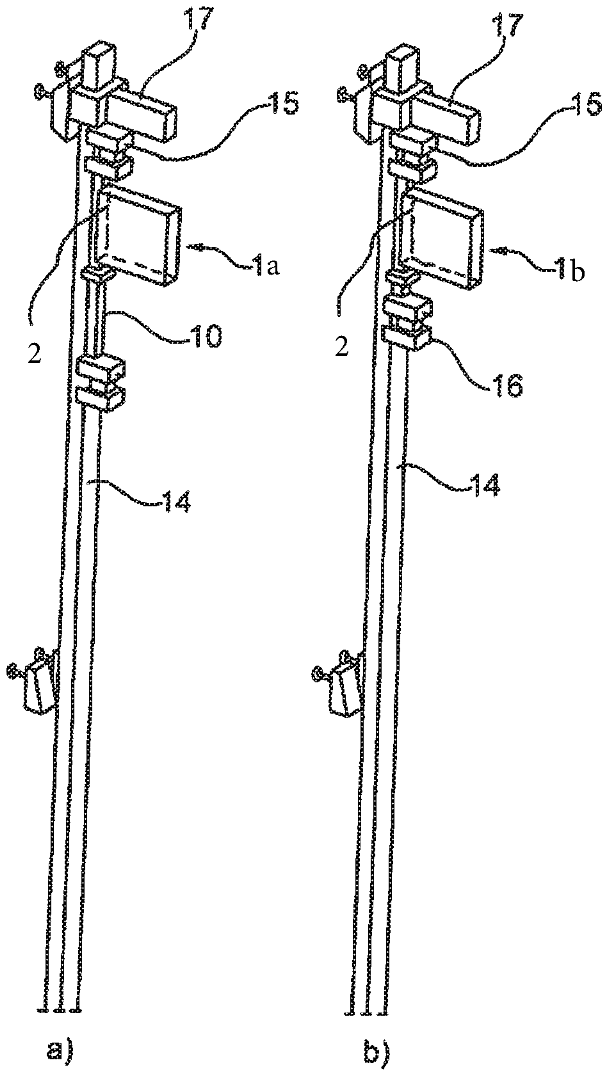
Figure 4:
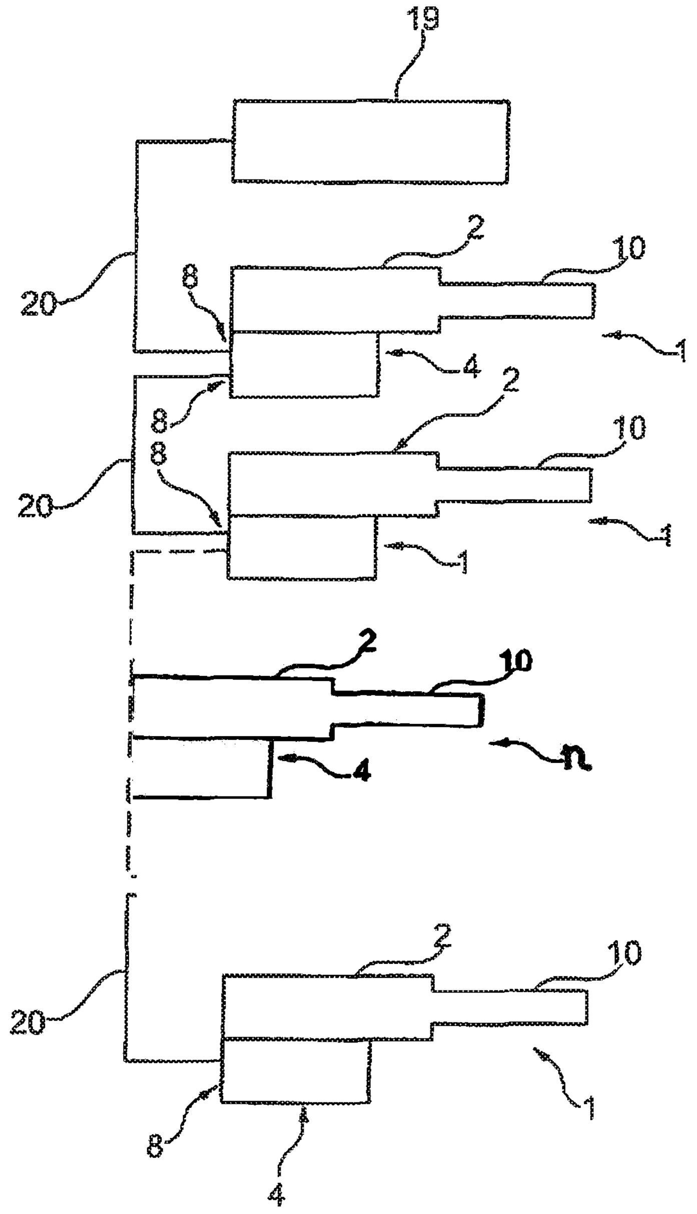

FIG. 1 schematically shows in section a hydraulic unit of a climbing device according to the invention for adjusting and/or climbing a scaffolding and/or a formwork and/or a platform, FIG. 2 schematically shows a perspective view of the hydraulic unit according to the invention in FIG. 1, FIG. 3 schematically shows a hydraulic unit on a climbing rail in two different operating states of a climbing device according to the invention for adjusting and/or climbing a scaffolding and/or a formwork and/or a platform and FIG. 4 schematically shows a topology or interconnection of multiple hydraulic units as represented by "n" and a separate central unit of a climbing device according to the invention.

FIG. 1 schematically represents a hydraulic unit 1 of a climbing device for adjusting and/or climbing a scaffolding not shown in further detail, and/or a formwork and/or a platform according to the invention. The hydraulic unit 1 comprises a hydraulic cylinder 2, an electric motor 3, a hydraulic pump 4 and a hydraulic tank 5 for storing hydraulic fluid/oil. The electric motor-powered pump 4 furthermore comprises a control block 6.

In addition the hydraulic unit 1 comprises an electronics unit 7 or control unit, particularly for controlling/regulating and monitoring the electric motor 3 and/or a sensor 11 and/or a display/signal light 9. The sensor 11 preferably takes the form of a position sensor 11 and is arranged in the hydraulic cylinder 2 or in the cylinder housing 12, in order to detect an adjustment or an extension/retraction of a piston 10 and to transmit signals/data, among other things to the electronics 7.

The hydraulic unit 1 furthermore comprises a housing 13, in which the aforementioned components are arranged and protected. In this case it is embodied as a closed housing shell, so that the components/elements arranged/integrated herein are protected from dirt and/or damage etc. The hydraulic unit 1 can therefore be carried as an integral module by one person, preferably by means of two carrying handles 17.

However, a hydraulic unit 1 or hydraulic units 1 when more than one hydraulic unit is deployed according to the invention is/are of comparatively large and heavy dimensions can also be designed/used as integral modules, which are two heavy tor one person, so that these large/heavy hydraulic units 1 preferably have to be transported by a lifting device such as an elevator, lifting platform, crane or the like, particularly between the construction sections, floors of the building, platforms of the scaffolding, etc.

The hydraulic unit 1 therefore comprises hydraulic components/actuators/sensors on the one hand and electrical/electronic components/actuators/sensors on the other, so that here the hydraulic unit 1 may also be referred to as a "hybrid cylinder". This means that in the hydraulic unit 1 according to the invention two technologies are combined with one another, that is to say here the hydraulics and the electrics/electronics.

The hydraulic unit 1 furthermore comprises multiple electrical plugs or connectors 8 or plug-and-socket connectors 8*a*, which ensure the electrical power supply to the hydraulic unit 1. For example, multiple connectors 8 are provided, on the one hand for the power supply of the electric motor 3 and/or the electronics 7 and on the other for relaying power to a second hydraulic unit 1 (cf. FIG. 4).

In addition, separate electrical connectors or the like may also be provided in order to form an electrical/electronic network or a digital bus system/network. This interlinking of multiple hydraulic units 1 may accordingly comprise any number of hydraulic units 1 as represented schematically in FIG. 4. The hydraulic units 1 here may be connected to one another/interconnected by means of electrical connecting cables 20 for the power supply and/or for the data/information transmission and/or connected to a separate, central control unit 19. The data/information transmission in particular may also be achieved wirelessly or by means of transmitters and receivers.

Climbing scaffoldings or rail climbing systems have long been used, so that a comprehensive representation and description of the climbing device according to the invention with all components and their operating principles or interaction/operating sequences are largely dispensed with, since the principles of these are known to the person skilled in the art.

Here only one hydraulic unit 1 according to the invention and its arrangement in FIG. 3 is illustrated in a first operative state 1*a* (FIG. 3*a*) and a second operative state 1*b* (FIG. 3*b*) as will be described in somewhat more detail. FIG. 3 represents two climbing shoes 15, 16, which are coupled to a climbing rail 14 in a known manner. The climbing shoes 15, 16 can be displaced/moved along the climbing rail 14, so that the hydraulic unit 1 is guided on/by the climbing rail 14. The climbing shoe 15, 16 has a detent system known to the person skilled in the art, by which its direction of movement is predefined. A travel/displacement in the opposite direction is not possible without influencing the climbing shoes 15, 16.

A support shoe 17 couples a scaffolding/platform, not further defined, or the like to the climbing rail 14. The climbing operation is illustrated by comparing the two FIGS. 3*a*) and 3*b*). In FIG. 3*a*) a rod side of a cylinder 2 (see FIG. 1) is supplied with hydraulic fluid/oil or pressurized by way of the hydraulic unit 1. The climbing shoe 15 prevents a downward movement, and therefore the climbing shoe 16 traverses in the direction of the cylinder 2.

In FIG. 3*b*) a bottom side of the cylinder 2 is supplied with oil by way of the hydraulic unit 1. The climbing shoe 16 prevents a downward movement, and therefore the climbing shoe 15 and the support shoe 17 traverse around the cylinder length. A climbing step is therefore completed. The operating states according to FIGS. 3*a*) and 3*b*) are repeated until the desired position the of the platform or the like, not further represented, is reached.

In general terms the following may be highlighted as particular advantages of the hydraulic unit 1 according to the invention:

1. Each hybrid cylinder or hydraulic unit 1 is a self-contained working unit.

2. Each hybrid cylinder or hydraulic unit 1 has a so-called "oil filling for life".

3. No opening of the (closed) hydraulic circuit of the hydraulic unit 1 is necessary.

4. No aging and replacement of hydraulic hoses (service life max. 6 years).

5. Travel measurement in the hybrid cylinder or hydraulic unit 1 allows an "absolute" synchronization of all hydraulic units 1 or hybrid cylinders.

6. No calibration necessary (offset and/or staggered travel possible in the synchronization)

7. Individual hybrid cylinders or hydraulic units 1 or in the complete network can be run with synchronization.

8. Any number of hybrid cylinders or hydraulic units 1 can be coupled (if necessary by multiple central units 19), for example 16-32-64 items or hydraulic units 1

9. Odd numbers of hybrid cylinders also possible for example 1-3-5-7 items or hydraulic units 1.

10. No power loss of the thrust force due to hydraulic flow resistances, for example through flow dividers, flow regulators etc.

11. No power loss of the thrust force due to long hose lines.

12. Negotiation of ramps (soft starting, variations in steepness/length etc.) possible.

13. Interconnection of the hybrid cylinders or hydraulic units 1 only by electrical cables.

14. (Sense/electronic/electrical) cut-off in the event of "Overload".

15. Overload control electrically adjustable.

16. Diagnostic facilities and display of the system status for example by Interlink.

What is claimed is:

1. A climbing device comprising:

at least one climbing rail for adjusting and/or climbing a scaffolding and/or a formwork and/or a platform;

at least one climbing shoe disposed on the at least one climbing rail;

at least one hydraulic unit comprising at least one hydraulic cylinder comprising at least one drive piston, arranged in a cylinder housing, with a hydraulic fluid for raising the climbing shoe and/or the climbing rail and/or the scaffolding and/or the formwork and/or the platform, the hydraulic unit having at least one hydraulic tank for storing hydraulic fluid;

an electric motor and a hydraulic pump driven by the electric motor for pressurizing the hydraulic fluid; and a single electrical connecting lead being arranged directly between a first hydraulic unit of the at least one hydraulic unit and a second hydraulic unit of the at least one hydraulic unit for the electrical and/or electronic connection and/or for the electrical power supply and/or for the electronic transmission of data and information.

2. The climbing device according to claim 1, wherein the at least one hydraulic unit comprises a housing shell and/or a housing frame, at least the cylinder housing of the hydraulic cylinder, the hydraulic tank, the electric motor and the hydraulic pump being arranged at least partially inside the housing shell and/or housing frame.

3. The climbing device according to claim 2, further comprising hydraulic lines inside the housing shell and/or housing frame for hydraulically connecting the hydraulic pump to the hydraulic cylinder or to a closed hydraulic circuit.

4. The climbing device according to claim 1, wherein a power supply device of the hydraulic unit comprises at least one electrical connection element for delivering electrical power.

5. The climbing device according to claim 1, wherein the at least one hydraulic unit comprises at least one electrical and/or electronic control unit for controlling at least one of the hydraulic cylinder or the electric motor.

6. The climbing device according to claim 1, wherein at least one electrical and/or electronic central unit is provided for controlling at least the first and the second hydraulic unit.

7. The climbing device according to claim 1, further comprising at least one piston sensor for registering the position/adjustment of the drive piston of the hydraulic cylinder.

8. The climbing device according to claim 5, wherein the electrical and/or the electronic control unit is an addressable control unit.

9. The climbing device of claim 1, wherein the device has at least two hydraulic cylinders being arranged on at least two climbing rails.

10. A climbing device comprising:

at least one climbing rail configured for adjusting or climbing at least one of a scaffolding, a formwork, or a platform;

at least one climbing shoe disposed on the at least one climbing rail;

at least one hydraulic unit comprising at least one hydraulic cylinder having at least one drive piston, arranged in a cylinder housing, with a hydraulic fluid configured for raising at least one of the climbing shoe, the climbing rail, the scaffolding, the formwork, or the platform, the hydraulic unit having at least one hydraulic tank for storing the hydraulic fluid;

an electric motor and a hydraulic pump driven by the electric motor configured for pressurizing the hydraulic fluid; and at least one electrical connecting lead being arranged between the at least one hydraulic unit and a second hydraulic unit for the electrical and/or electronic connection and/or for the electrical power supply and/or for the electronic transmission of data and information, at least one electrical and/or electronic central unit for controlling at least the first and the second hydraulic unit, the at least one electrical and/or electronic control unit being integrated into the first hydraulic unit such that the first hydraulic unit is a master hydraulic unit and the second hydraulic unit is a slave hydraulic unit.

11. A climbing device comprising:

at least one climbing rail configured for adjusting or climbing at least one of a scaffolding, a formwork, or a platform;

at least one climbing shoe disposed on the at least one climbing rail;

at least one hydraulic unit comprising at least one hydraulic cylinder having at least one drive piston, arranged in a cylinder housing, with a hydraulic fluid configured for raising at least one of the climbing shoe, the climbing rail, the scaffolding, the formwork, or the platform, the hydraulic unit having at least one hydraulic tank for storing the hydraulic fluid, the at least one hydraulic unit comprising a first connector operably connected to a power supply for supplying power to the at least one hydraulic unit, the at least one hydraulic unit comprising a second connector, distinct from the first connector;

an electric motor and a hydraulic pump driven by the electric motor configured for pressurizing the hydraulic fluid; and a single electrical connecting lead being arranged directly between the second connector and a second hydraulic unit for supplying power to the second hydraulic unit.

* * * * *